United States Patent
Asrani et al.

(10) Patent No.: US 9,666,937 B2
(45) Date of Patent: May 30, 2017

(54) LTE MIMO ANTENNA SYSTEM FOR AUTOMOTIVE CARBON FIBER ROOFTOPS

(71) Applicant: Google Inc., Mountain View, CA (US)

(72) Inventors: Vijay Asrani, San Jose, CA (US); Felix Jose Alvarez Rivera, San Jose, CA (US); Douglas Blake Kough, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 32 days.

(21) Appl. No.: 14/753,970

(22) Filed: Jun. 29, 2015

(65) Prior Publication Data

US 2016/0380343 A1    Dec. 29, 2016

(51) Int. Cl.
  *H01Q 1/24* (2006.01)
  *H01Q 1/32* (2006.01)
  *H01Q 1/48* (2006.01)
  *H01Q 21/24* (2006.01)

(52) U.S. Cl.
  CPC .............. *H01Q 1/3275* (2013.01); *H01Q 1/48* (2013.01); *H01Q 21/24* (2013.01)

(58) Field of Classification Search
  CPC .. H01Q 1/32; H01Q 1/04; H01Q 1/27; H01Q 1/16; H01Q 1/36; H01Q 1/10; H01Q 1/3275; H01Q 1/512; H01Q 1/24; H01Q 1/48
  USPC ................ 343/713, 809, 822, 846, 806, 895
  See application file for complete search history.

(56) References Cited

U.S. PATENT DOCUMENTS

| | | | | |
|---|---|---|---|---|
| 5,422,650 A | * | 6/1995 | Hill ........................ | H01Q 7/005 343/713 |
| 5,514,206 A | * | 5/1996 | Hoogesteger ...... | B01D 19/0042 95/261 |
| 5,517,206 A | * | 5/1996 | Boone ...................... | H01Q 9/27 343/792.5 |
| 7,348,930 B2 | * | 3/2008 | Lastinger ............... | H01Q 1/246 343/841 |
| 8,686,907 B2 | * | 4/2014 | Jan ......................... | H01Q 1/521 343/713 |
| 9,531,452 B2 | * | 12/2016 | George ................... | H04B 7/024 |
| 2012/0127050 A1 | * | 5/2012 | Song ..................... | H01Q 1/1271 343/756 |
| 2012/0321314 A1 | * | 12/2012 | Oren ...................... | H04B 7/022 398/66 |

(Continued)

*Primary Examiner* — Lam T Mai
(74) *Attorney, Agent, or Firm* — McDonnell Boehnen Hulbert & Berghoff LLP

(57) ABSTRACT

The present disclosure is related to an antenna system for a vehicle, such as a vehicle that has a non-metallic roof. The antenna system includes two metallic supports coupled to the roof. Additionally, the antenna system includes a first MIMO antenna pair. A first antenna of the first MIMO antenna pair is coupled to a first support of the two metallic supports, and a second antenna of the first MIMO antenna pair is coupled to a second support of the two metallic supports. The antenna system further includes a second MIMO antenna pair. A first antenna of the second MIMO antenna pair is coupled to the first support of the two metallic supports, and a second antenna of the second MIMO antenna pair is coupled to the second support of the two metallic supports. Yet further, the two metallic supports of the antenna system are physically separated from each other.

17 Claims, 5 Drawing Sheets

(56) References Cited

U.S. PATENT DOCUMENTS

| | | | |
|---|---|---|---|
| 2013/0050027 A1* | 2/2013 | Kim | H01Q 1/243 343/700 MS |
| 2013/0069845 A1* | 3/2013 | Swais | H01Q 1/42 343/872 |
| 2014/0015717 A1* | 1/2014 | Kowalewicz | H01Q 1/3275 343/715 |
| 2014/0106684 A1* | 4/2014 | Burns | H01Q 1/243 455/78 |
| 2015/0061964 A1* | 3/2015 | Sugimoto | H01Q 9/42 343/893 |
| 2015/0253419 A1* | 9/2015 | Alland | G01S 7/02 342/385 |
| 2015/0253420 A1* | 9/2015 | Alland | G01S 13/4454 342/156 |
| 2016/0013839 A1* | 1/2016 | Song | H04B 7/0413 375/316 |

\* cited by examiner

LTE MIMO ANTENNA SYSTEM FOR AUTOMOTIVE CARBON FIBER ROOFTOPS

BACKGROUND

Unless otherwise indicated herein, the materials described in this section are not prior art to the claims in this application and are not admitted to be prior art by inclusion in this section.

With the advance of modern communication systems and vehicular technology, many vehicles contain cellular communication technology. Cellular communication technology may enable a vehicle to have both voice and data communication capabilities. To enable higher data rates, a communication system may use a Multiple Input, Multiple Output (MIMO) antenna system. A MIMO antenna system has more than one antenna configured to send and receive communication signals. In a MIMO antenna system, it may be desirable for each antenna to operate uncoupled from any other antenna of the MIMO system.

SUMMARY

Disclosed herein are examples that relate to an antenna system for use in vehicular system. In one aspect, the present application describes an antenna system for a vehicle, where the vehicle comprises a non-metallic roof. The antenna system includes a first metallic support coupled to the roof. The antenna system also includes a first antenna coupled to the first metallic support. The first metallic support forms a ground plane for the antenna and separates the first antenna from the non-metallic roof.

In another aspect, the present application describes a method. The method includes forming a MIMO communication system for a vehicle. The vehicle includes a non-metallic roof. The method further includes transmitting via a first antenna coupled to the first metallic ground plane a first electromagnetic communication signal. Additionally, the method includes transmitting via a second antenna coupled to the second metallic ground plane a second electromagnetic communication signal.

In yet another example, an antenna system is provided. The antenna system may be for a vehicle including a non-metallic roof. The antenna system includes two metallic supports coupled to the roof. Additionally, the antenna system includes a first MIMO antenna pair. A first antenna of the first MIMO antenna pair is coupled to a first support of the two metallic supports, and a second antenna of the first MIMO antenna pair is coupled to a second support of the two metallic supports. The antenna system further includes a second MIMO antenna pair. A first antenna of the second MIMO antenna pair is coupled to the first support of the two metallic supports, and a second antenna of the second MIMO antenna pair is coupled to the second support of the two metallic supports. Yet further, the two metallic supports of the antenna system are physically separated from each other.

The foregoing summary is illustrative only and is not intended to be in any way limiting. In addition to the illustrative aspects, examples, and features described above, further aspects, examples, and features will become apparent by reference to the figures and the following detailed description.

DETAILED DESCRIPTION

Figure 1:
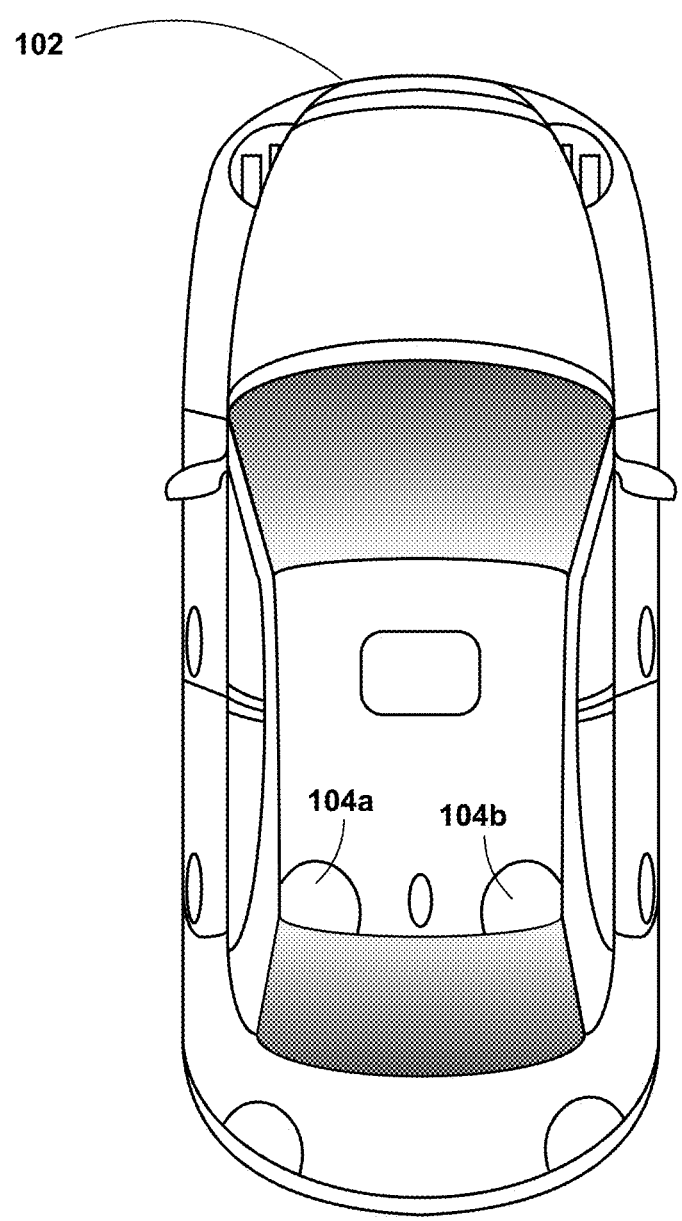
FIG. 1 illustrates an example layout of communication modules on a vehicle.

In the following detailed description, reference is made to the accompanying figures, which form a part hereof. In the figures, similar symbols typically identify similar components, unless context dictates otherwise. The illustrative examples described in the detailed description, figures, and claims are not meant to be limiting. Other examples may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for an antenna system for MIMO communication for use in vehicular system. The roof of a vehicle may be made of one or more different materials, each of which may impact the performance of a MIMO antenna system in different ways. For example, a vehicle may have a metallic roof. The metallic roof may function as a ground plane for the MIMO antenna system. However, a metallic roof may also cause coupling between antenna elements of the MIMO antenna system. In another example, the vehicle may have a carbon fiber (or other non-metallic) roof. The carbon fiber roof may act as an electronically lossy plane to which the antennas are mounted. The electronic properties of the carbon fiber roof may cause the antenna(s) to have decreased performance. The antenna performance decreased may include a decrease in impedance matching, a decrease in efficiency, a poor radiation pattern, or other performance decreases. Therefore, it may be desirable to create an antenna system that can be used with a carbon fiber (or other non-metallic) roof, while maintaining sufficient antenna performance.

The presently-disclosed antenna system includes of a metallic support (described herein as a metallic tub) that covers at least a portion of the carbon fiber roof of the vehicle. The tub provides a metallic ground plane for the antenna's operation. Further, the metallic tub also reduces losses caused by the carbon fiber roof, thus increasing antenna performance. The antennas may be mounted on the metallic tub.

Because the presently disclosed system may be used with a MIMO antenna configuration (i.e., an antenna configuration having more than one antenna configured to send and receive communication signals), there may be more than one antenna in the system. In order to achieve the best MIMO performance, it may be desirable for the antennas of the MIMO system to be uncoupled and uncorrelated. In one example, each antenna of the MIMO system may be: (i) spaced such that the distance between antennas provides spatial diversity, (ii) aligned with a polarization orthogonal to the other antennas of the MIMO system; and (iii) coupled to a different metallic tub than the other antennas of the MIMO system. By being physically separated by a distance, aligned orthogonally, and having a separate tub acting as the ground plane, the antennas may be further uncoupled and uncorrelated.

In additional examples, the antenna system may be further configured to operate with multiple wireless carriers via a MIMO antenna configuration. In these examples, each wireless carrier may have an associated wireless transceiver (e.g. radio hardware or modem) on the car (i.e., one wireless transceiver may be configured to communicate with only one wireless carrier). Because each wireless carrier may have an associated wireless transceiver configured for MIMO communication, it may be further desirable for each transceiver to be coupled to its own respective set of antennas. In one example, a vehicle may be configured with two wireless transceivers, each transceiver configured to operate in MIMO mode having two antennas. Therefore, the antenna system may have four antennas total. As previously discussed, it is desirable for the antennas to be uncoupled and uncorrelated. However, the desire for antennas to be uncoupled and uncorrelated is primarily focused within a single transceiver operation. Thus, in some examples, it is not critical for the two antennas of the present disclosure, operating with different transceivers, to be uncoupled and uncorrelated as if the two antennas were operating with a single transceiver. However, in some alternate examples, it is may be desirable for the two antennas of the present disclosure, operating with different transceivers, to be uncoupled and uncorrelated as if the two antennas were operating with a single transceiver because the two transceivers may be operating in the same frequency band.

In one example, the system may include 2 different LTE modems to serve two different carriers (or, to provide redundancy for a single carrier), and each LTE modem may have 2 antennas for MIMO operation. The frequency range to be supported by the antennas and modems may be 698 to 960 MHz and 1710 to 2690 MHz. Thus, the antennas may each be dual-band antennas. The frequencies supported may be a superset of all the cellular bands, which may have challenges for designing antennas while maintaining the high efficiency, correlation, and coupling requirements.

FIG. 1 illustrates an example layout of communication modules 104a and 104b for an autonomous vehicle 102. Each of the communication modules 104a and 104b of the vehicle 102, may include a respective antenna system for MIMO communication. As shown in FIG. 1, an autonomous vehicle 102 may contain more than one communication module. For example, the autonomous vehicle 102 may have two communication modules 104a and 104b mounted to the roof of the vehicle. However, a vehicle could include a greater or fewer number of communication modules.

Each communication module of the vehicle 102 may be configured with at least one antenna and a metallic ground plane. As previously discussed, a roof of a vehicle may be made of carbon fiber, or another material, that may act as an electronically lossy plane. An electronically lossy plane can cause poor antenna performance when an antenna is mounted near the lossy plane. To mitigate the effects caused by the lossy plane, each communication module may include a metallic ground plane upon which antennas may be mounted. In some examples, the metallic ground plane may be shaped to conform to the underlying roof structure of the vehicle. In these examples, the metallic ground plane may be tub shaped.

In some additional examples, all the communication modules of the vehicle may be configured with the same number of antennas. For example, each communication module may include two antennas. Additionally, the geometry of the communication modules may change depending on the location of a respective communication module. For example, a communication module located on the driver side of a vehicle may have a geometry that is mirrored from corresponding communication module located on the passenger side of the vehicle.

The number of communication modules may be chosen based on a number of criteria, such as ease of manufacturing of the communication modules, vehicle placement, or other criteria. For example, some communication modules may be configured with a planar structure that is sufficiently small. The planar communication modules may be mountable at various positions on a vehicle. For example, a vehicle may have a dedicated communication housing mounted on the top of the vehicle. The communication housing may contain multiple communication modules. However, in other examples, communication modules may be placed within the vehicle structure.

When communication modules are located within the vehicle structure, each may not be visible from outside the vehicle without removing parts of the vehicle. Thus, in some examples, the vehicle may not be altered aesthetically, cosmetically, or aerodynamically from adding communication modules. For example, communication modules may be placed under vehicle trim work, such as under a roof covering, or other locations as well. In some examples, it may be desirable to place communication modules in positions where the object covering the communication modules is at least partially transparent to electromagnetic energy. For example, various plastics, polymers, and other materials may form part of the vehicle structure and cover the communication modules, while allowing the electromagnetic signal to pass through. Therefore, the antenna system may not be visible when the vehicle is viewed from outside as the vehicle's housing may cover the components of the antenna system.

Figure 2A:
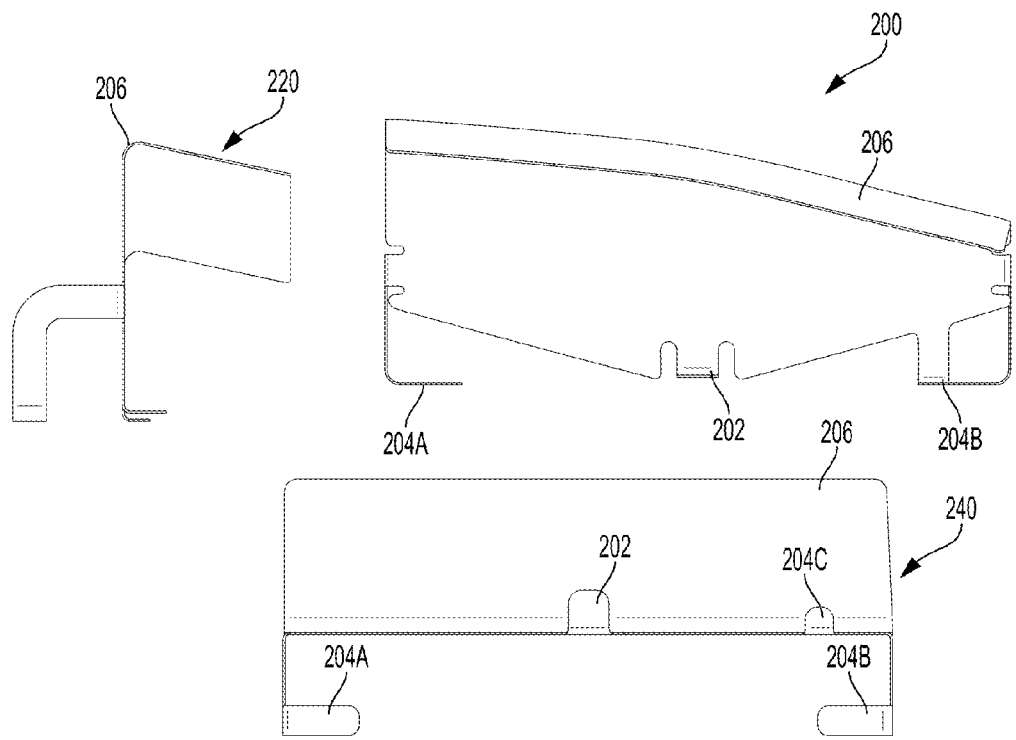
FIG. 2A illustrates an example antenna.

FIG. 2A illustrates three different view of an example antenna for use with the methods and apparatuses described herein. The antenna can be seen in front view 200, side view 220, and bottom view 240. The antenna of FIG. 2A is one example antenna. Other antenna geometries may be used based on design criteria. The frequency range to be supported by the example antenna may be 698 to 960 MHz and 1710 to 2690 MHz. Thus, the antenna may be a dual band antenna. However, in different examples, the antenna may be configured to operate with different (including more or fewer) frequency bands.

As shown in FIG. 2A, the antenna may include a feed 202. The feed 202 may be configured to receive an electromagnetic signal from radio hardware for the antenna to radiate away from the vehicle. The feed 202 may also be configured to couple a signal received by the antenna from outside of the vehicle to radio hardware for processing. The antenna may also include a plurality of spacers 204A-204C. The plurality of spacers 204A-204C may be configured to both (i) provide a desired separation between the antenna and a metallic ground plane and (ii) provide an impedance matching for the antenna 200. The plurality of spacers 204A-204C may also provide mechanical stability and robustness for the antenna. The plurality of spacers 204A-204C may prevent large movements of the antenna while the vehicle is moving.

Additionally, the antenna may include a radiating portion 206. The radiating portion 206 may be configured to cause a guided electromagnetic signal on the antenna to radiate away from the antenna as an unguided signal. Further, the radiating portion 206 may be configured to convert an unguided electromagnetic signal from outside of the vehicle to a guided signal on the antenna. Essentially, the radiating portion 206 may function to convert guided waves that are located in the vehicle's systems to unguided waves and vice versa.

Figure 2B:
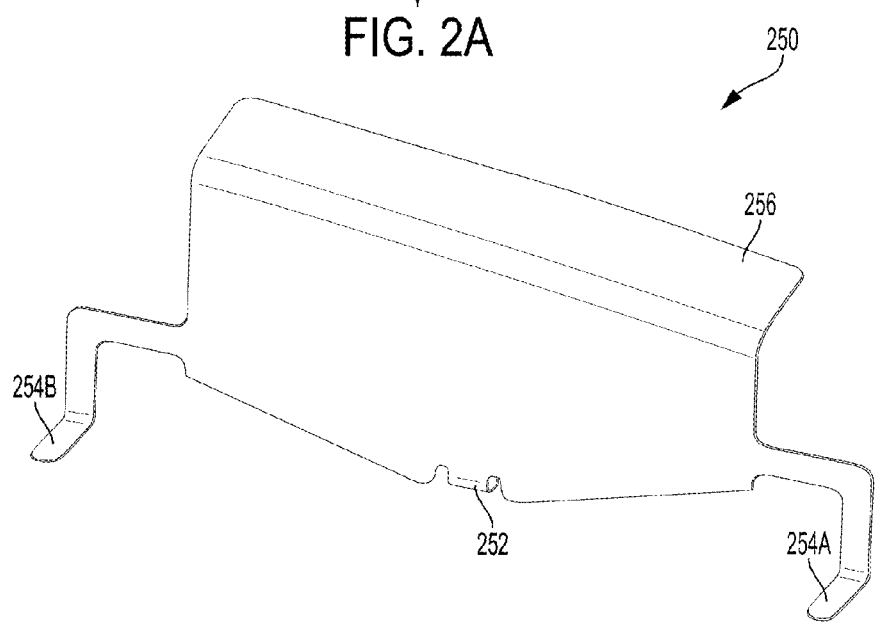
FIG. 2B illustrates an example antenna.

FIG. 2B illustrates a three dimensional view of an example antenna 250 for use with the methods and apparatuses described herein. The antenna of FIG. 2B may be similar to the antennas described with respect to FIG. 2A, such as having dual-band operation.

As shown in FIG. 2B, the antenna 250 may include a feed 252, a plurality of spacers 254A-254B, and a radiating portion 256. Because the antenna 250 disclosed in FIG. 2B is similar to the antenna described with respect to FIG. 2A, the various component of the antenna 250 may function in a similar manner to those in FIG. 2B. As previously discussed, the feed 252 may be configured to receive an electromagnetic signal from radio hardware for the antenna to radiate away from the vehicle and may also be configured to couple a signal received by the antenna from outside of the vehicle to radio hardware for processing. The plurality of spacers 254A-254B configured to both (i) provide a desired separation between the antenna and a metallic ground plane and (ii) provide an impedance matching for the antenna 250. The plurality of spacers 254A-254B may also provide mechanical stability and robustness for the antenna. The plurality of spacers 254A-254B may prevent large movements of the antenna while the vehicle is moving.

Although FIGS. 2A and 2B show a single geometry for an antenna. However, the present disclosure is in no way limited to the geometry, shape, type, or configuration of antenna shown in FIGS. 2A and 2B. One skilled in the art would be able to modify and substituted other antennas within the present disclosure.

Figure 3A:
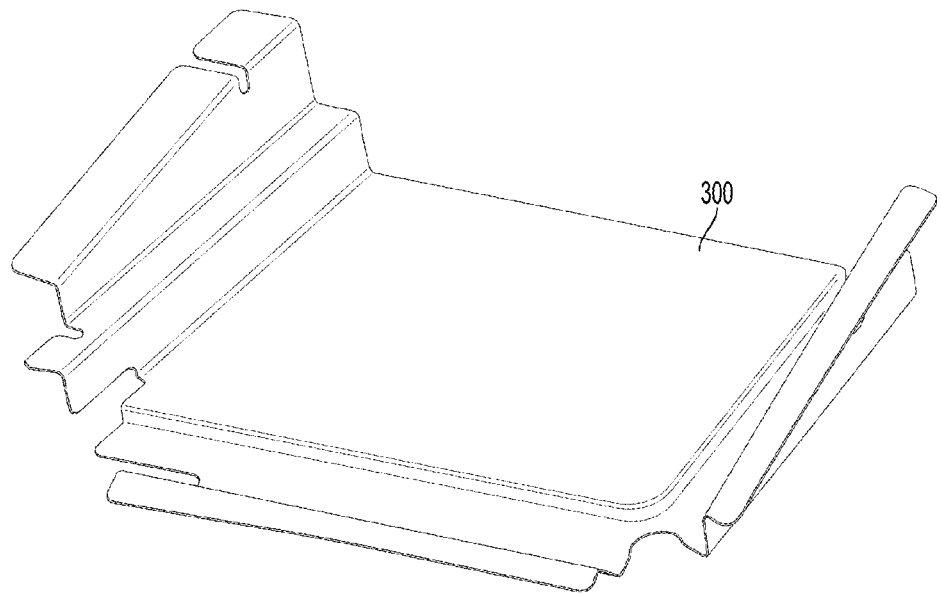
FIG. 3A illustrates an example metallic support.

FIG. 3A illustrates an example metallic support 300 for use with the methods and apparatuses described herein. The metallic support 300 may serve multiple functions within the context of the present disclosure. One function of the metallic support 300 may be functioning as a ground plane on which antennas may be mounted. Additionally, another function of the metallic support 300 may be providing a separation between an antenna and a non-metallic roof of the vehicle. In yet another function, the metallic support 300 may help to provide isolation between antenna pairs (discussed further with respect to FIG. 3B below). Even further, the metallic support 300 may function to conform to the roof of the vehicle and may form a tub shape.

As previously discussed, a vehicle to which the metallic support 300 may be mounted may have a carbon fiber (or other electromagnetically lossy material) roof. Without the metallic support 300, the carbon fiber roof would act as an electromagnetically lossy plane and may cause the antenna (s) to have decreased performance. Therefore, by having a metallic support 300 mounted on the carbon fiber roof, the antenna may have an appropriate metallic ground plane for efficient antenna operation.

The metallic support 300 may cover at least a portion of the carbon fiber roof of the vehicle. In some examples, the metallic support 300 may be shaped to conform (or approximately conform) to the shape of the roof the vehicle. In other examples, the metallic support 300 may be shaped to fit in an area of the roof of the vehicle where some of the carbon fiber has been removed. The metallic support 300 may take other possible shapes as well.

Figure 3B:
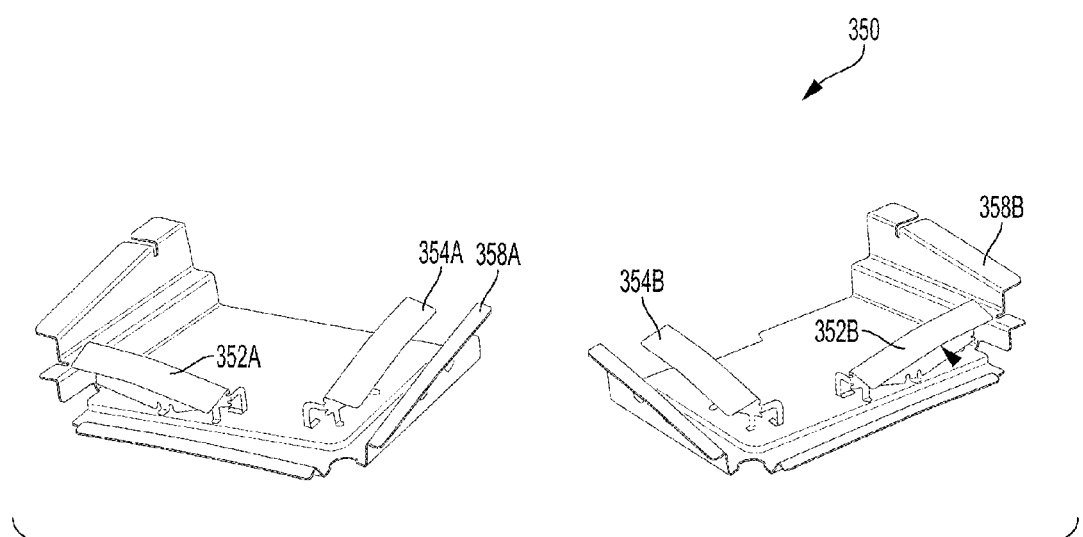
FIG. 3B illustrates two example metallic supports, each having two antennas mounted.

FIG. 3B illustrates a portion of two communication modules, each including two example metallic supports 358A and 358B, each having two antennas mounted 352A, 352B, 354A, and 354B. The two example metallic supports 358A and 358B may form a portion of communication modules 104A and 104B of FIG. 1, respectively. In one example, communication module 104A of FIG. 1 may include metallic support 358A and two antennas 352A, 354A. Additionally, communication module 104B of FIG. 1 may include metallic support 358B and two antennas 352B, 354B. As shown in FIG. 3B, one communication module may include antennas that have an alignment that is reflected across a center axis of the car from the antennas of the other communication module. In one example, each communication module may include a metallic support and two antennas. In some other examples, each communication module may have more or fewer antennas as well.

The communication modules of FIG. 3B may form MIMO antenna pairs for use in a communication system. As previously discussed, a MIMO antenna system has more than one antenna configured to send and receive communication signals. In a MIMO antenna system, it may be desirable for each antenna to operate uncoupled from any other antenna of the MIMO system. The communication modules of FIG. 3B may aid in forming a MIMO communication system by providing both spatial and polarization based antenna diversity. By providing both spatial and polarization diversity, the antennas that form a MIMO antenna pair may have antennas that are relatively uncoupled and uncorrelated with each other. The MIMO antenna pair may have radiation pattern diversity that are uncoupled and uncorrelated with each other.

In one example, a MIMO antenna pair include one antenna from each of the communication modules. A first MIMO antenna pair may include antennas 352A and 354B. A second MIMO antenna pair may include antennas 352B and 354A.

The communication modules of FIG. 3B provide spatial diversity due to the antennas being physically separated from each other. For example, as shown in FIG. 1, the two communication modules may be located on opposite sides of the vehicle. Thus, the two antennas may be separated by a distance that is close to the width of the vehicle. Additionally, the two metallic supports 358A and 358B of the communication modules may be physically separate from each other as well. By having the metallic supports 358A and 358B separate from each other, each communication module may have its own respective ground plane. By having each antenna of a MIMO pair coupled to its own ground plane, the antennas may be further isolated from each other to reduce coupling and correlation.

The communication modules of FIG. 3B provide radiation pattern diversity due to the antennas of each MIMO pair being aligned orthogonally from each other. As first MIMO pair includes antennas 352A and 354B, the antennas may be aligned orthogonally (i.e. that is perpendicularly to each other). Similarly, as the second antenna pair includes antennas 352B and 354A, the antennas may be aligned orthogonally (i.e. that is perpendicularly to each other). Because the antennas of each MIMO pair are aligned orthogonally, the antennas of the MIMO pair will have diverse radiation patterns. Thus, the antennas will have uncorrelated radiation pattern diversity due to their respective alignments.

Figure 4:
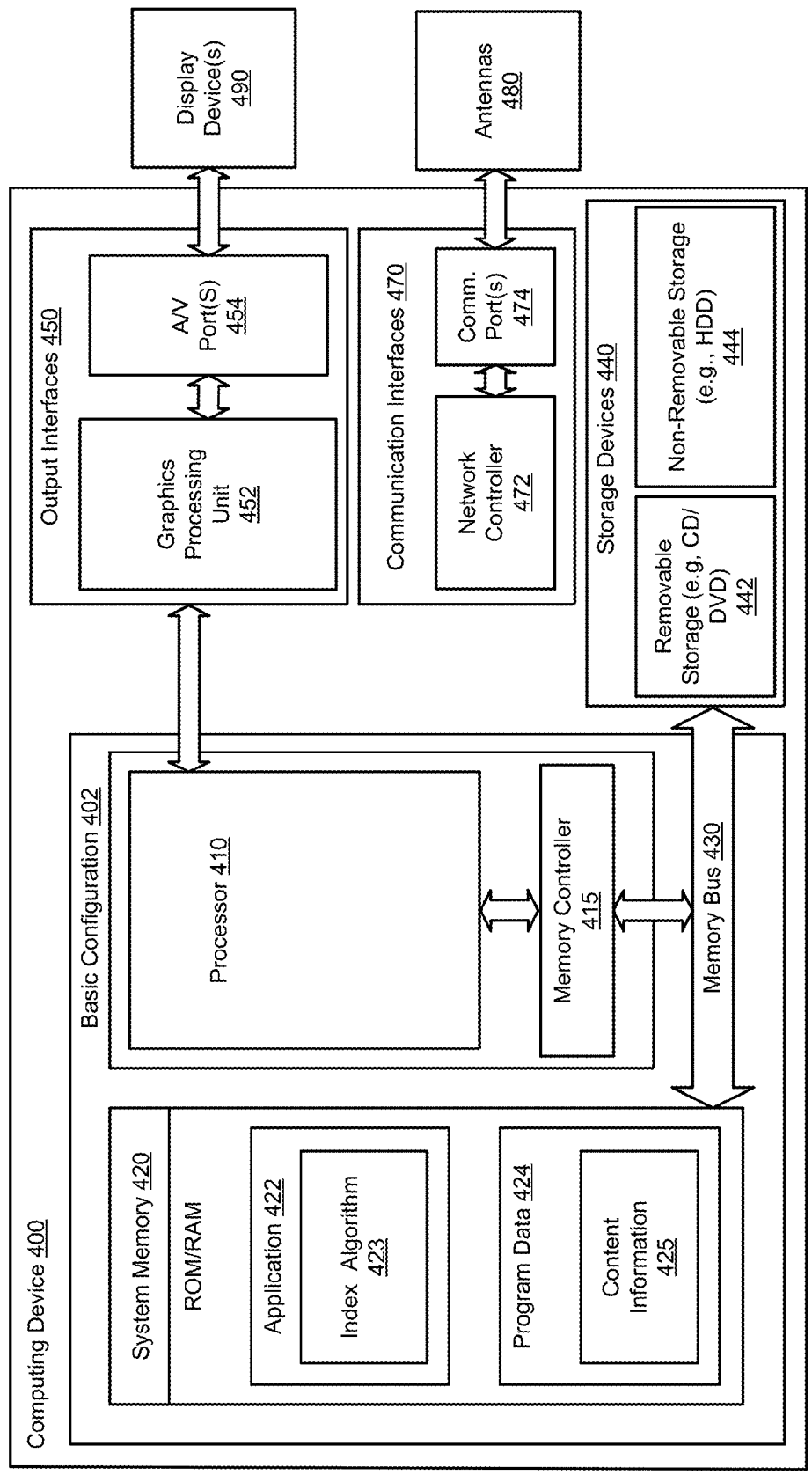
FIG. 4 illustrates an example computing device for performing some of the methods disclosed herein.

In some examples, a computing device may implement some of the disclosed methods as computer program instructions encoded on a non-transitory computer-readable storage media in a machine-readable format, or on other non-transitory media or articles of manufacture. For example, the computing device may be integrated within the radio hardware or it may be a separate computing device in communication with the radio hardware. FIG. 4 is a schematic illustrating a conceptual partial view of an example computer program product that includes a computer program for executing a computer process on a computing device, arranged according to at least some examples presented herein.

FIG. 4 illustrates a functional block diagram of a computing device 400, according to an examples. The computing device 400 can be used to perform functions in connection with an LTE MIMO Antenna System. In particular, the computing device can be used to perform some or all of the functions discussed above in connection with FIGS. 1-3. As shown in FIG. 4, the antennas 480 are located external to the computing device 400.

The computing device 400 can be or include various types of devices, such as, for example, a server, personal computer, mobile device, cellular phone, or tablet computer. In a basic configuration 402, the computing device 400 can include one or more processors 410 and system memory 420. A memory bus 430 can be used for communicating between the processor 410 and the system memory 420. Depending on the desired configuration, the processor 410 can be of any type, including a microprocessor (µP), a microcontroller (µC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and nonvolatile memory (such as ROM, flash memory). The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470.

The communication interface 470 can include a network controller 472, which can be arranged to facilitate communication with one or more other computing devices, via antennas 480, over a network communication by way of one or more communication ports 474. The network controller may take the form of radio hardware, such as a cellular modem configured for voice and/or data communication. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The communication interface 470 may include radio hardware configured to provide a cellular radio connection. The cellular radio connection may be able to provide a data and/or voice connection. In some further examples, the radio hardware may also be configured to operate a MIMO antenna configuration. In yet another example, the radio hardware may contain more than one modem. Each modem may be configured to operate with a different network provider. Additionally, each modem may be connected to its own respective MIMO pair of antennas. For example, as previously discussed, a vehicle may have four antennas configured into to MIMO antenna pairs. Each MIMO antenna pair may be coupled to one of the two modems. Thus, each MIMO pair may be configured to be in communication with only one network provider.

The computing device 400 can be implemented as embedded computing hardware within a vehicle. The various component of computing device 400 may be located through a vehicle. The computing device 400 can also be implemented as a personal computer including both laptop computer and non-laptop computer configurations.

The one or more programming instructions can be, for example, computer executable instructions. A computing device (such as the computing device 400 of FIG. 4) can be configured to provide various operations in response to the programming instructions conveyed to the computing device by one or more of the computer-readable medium, the computer recordable medium, and the communications medium.

Figure 5:
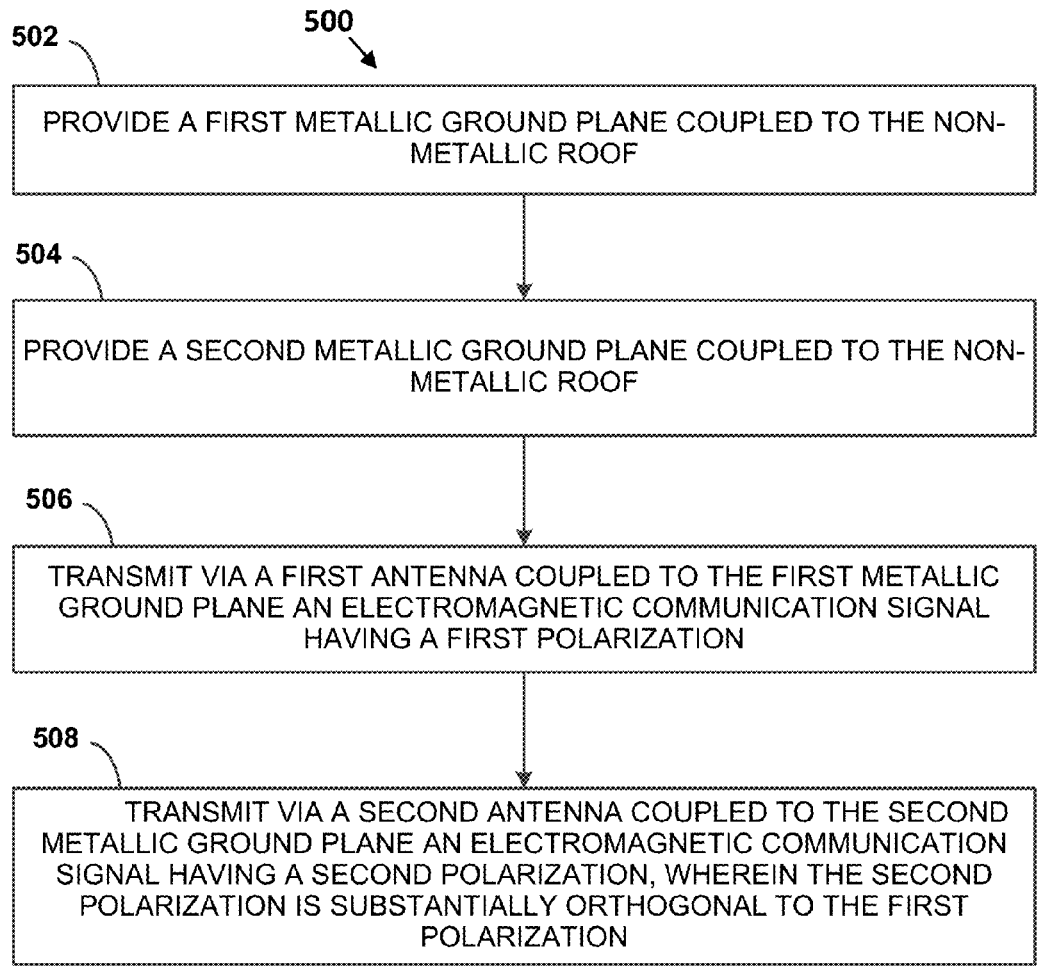
FIG. 5 is an example method.

FIG. 5 is an example method for communication with LTE MIMO antenna system for automotive carbon fiber rooftops. Moreover, the method 500 of FIG. 5 will be described in conjunction with FIGS. 1-4. A vehicular communication system may be configured to communicate over a wireless network, such as a cellular communication network. To communicate over a wireless network, the communication system may transmit and receive electromagnetic signals. In order to achieve better communication performance, the communication system may contain multiple antennas configured as a MIMO antenna system. As previously discussed, a MIMO antenna system may use multiple antennas to both transmit and receive communication signals. However, because a vehicle may have a roof that is non-metallic and electrically lossy, it may be desirable to provide a non-lossy ground plane for the antennas to improve their performance.

At block 502, the method 500 includes providing a first metallic ground plane coupled to the non-metallic roof. The first metallic ground plane may be similar to or the same as the metallic support discussed above with respect to FIG. 3A. The first metallic ground plane may be located on a side of the vehicle (e.g., the passenger or driver side). Alternatively, first metallic ground plane may be located on either the front of the back of the vehicle.

As previously discussed, the first metallic ground plane may cover at least a portion of the carbon fiber roof of the vehicle. The first metallic ground plane may be shaped to conform (or approximately conform) to the shape of the roof the vehicle. In other examples, the first metallic ground plane may be shaped to fit in an area of the roof of the vehicle where some of the carbon fiber has been removed. For example, in a regions where the first metallic ground plane is to couple to the roof, a portion of the carbon fiber may be cut out, removed, or shaped in a way to allow the first metallic ground plane to couple to the roof. The metallic support 300 may take other possible shapes as well.

At block 504, the method 500 includes providing a second metallic ground plane coupled to the non-metallic roof. The second metallic ground plane may be similar to the first metallic ground plane provided at block 502. However, the second metallic ground plane may be mounted to the vehicle in a different location than the first metallic ground plane. For example, if the first metallic ground plane was mounted on the driver's side, the second metallic ground plane may be mounted on the passenger's side. Further, if the first metallic ground plane is be located on the front of the vehicle, the second metallic ground plane is be located on the back of the vehicle. Additionally, the first metallic ground plane and the second metallic ground plane may be physically separated from each other. By physically separating the first metallic ground plane and the second metallic ground plane, electrical signals that are on one ground plane will not easily couple to the second ground plane.

At block 506, the method 500 includes, transmitting via a first antenna coupled to the first metallic ground plane an electromagnetic communication signal having a first polarization. The first antenna may be configured to receive an electromagnetic signal from a radio unit via a first antenna feed. When the first antenna receives the electromagnetic signal from the first feed, an electrical current may be created on the surface of the first antenna. The electrical current on the surface of the first antenna may cause the antenna to transmit (i.e. radiate) a signal into free space. Thus, the first antenna may convert an electromagnetic signal coupled into the first antenna feed into a signal radiating in free space away from the vehicle.

The first antenna may transmit the electromagnetic signal with a first radiation pattern or polarization. The radiation pattern of the transmitted electromagnetic signal is based on the orientation of the respective antenna in a MIMO pair. The polarization of the transmitted electromagnetic signal is based on the direction which the electrical current on the surface of the antenna flows. Thus, the orientation and the geometry of the first antenna may dictate the radiation pattern and/or polarization of the transmitted electromagnetic signal.

At block 508, the method 500 includes transmitting via a second antenna coupled to the second metallic ground plane an electromagnetic communication signal having a second radiation pattern or polarization, wherein the second pattern or polarization is substantially diverse or orthogonal to the first antenna. The second antenna may be similar to the first antenna. However, the second antenna may be coupled to a different metallic ground plane than the first antenna. Additionally, the second antenna may have a different orientation than the first antenna.

Similar to the first antenna, the second antenna may also be configured to receive and electromagnetic signal from a radio unit via a second antenna feed. Further, when the second antenna receives the electromagnetic signal from the second feed, an electrical current may be created on the surface of the second antenna. The electrical current on the surface of the second antenna may cause the antenna to transmit (i.e. radiate) a signal into free space. Thus, like the first antenna, the second antenna may convert an electromagnetic signal coupled into the second antenna feed into a signal radiating in free space away from the vehicle.

Also similar to the first antenna, the second antenna may transmit the electromagnetic signal with a second radiation pattern or polarization. Because the radiation pattern or polarization of the transmitted electromagnetic signal is based on the direction which the electrical current on the surface of the antenna flows, and the second antenna has a different orientation than the first antenna, the second radiation pattern or polarization may be different than the first radiation pattern or polarization. In some examples, the first antenna and the second antenna may be aligned orthogonally with respect to each other. Thus, the electromagnetic signals radiated by each antenna with be orthogonal as well.

Therefore, due to the space between the antennas and the orthogonally of the polarizations, it may be possible to create a MIMO antenna pair of antennas that provide both spatial and polarization diversity. Because the antennas that form a MIMO antenna pair may have both spatial and polarization diversity, the antennas may function as if they are relatively uncoupled and uncorrelated with each other. Therefore, method 500 and the presently disclosed systems and apparatuses may be used to create a high performance MIMO antenna system mounted to an electrically lossy roof of vehicle.

In some cases a portion of the disclosed methods can be implemented as computer program instructions encoded on a non-transitory computer-readable storage medium in a machine-readable format, or on other non-transitory media or articles of manufacture. The computer program product includes a computer program for executing a computer process on a computing device, arranged according to some disclosed implementations.

The computer program product is provided using a signal bearing medium. The signal bearing medium can include one or more programming instructions that, when executed by one or more processors, can provide functionality or portions of the functionality discussed above in connection with FIGS. 1-3 and FIG. 5. In some implementations, the signal bearing medium can encompass a computer-readable medium such as, but not limited to, a hard disk drive, a CD, a DVD, a digital tape, or memory. In some implementations, the signal bearing medium can encompass a computer-recordable medium such as, but not limited to, memory, read/write (R/W) CDs, or R/W DVDs. In some implementations, the signal bearing medium can encompass a communications medium such as, but not limited to, a digital or analog communication medium (for example, a fiber optic cable, a waveguide, a wired communications link, or a wireless communication link). Thus, for example, the signal bearing medium can be conveyed by a wireless form of the communications medium (for example, a wireless communications medium conforming with the IEEE 802.11 standard, cellular communication standards, or other transmission protocols).

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and examples have been disclosed herein, other aspects and examples will be apparent to those skilled in the art. The various aspects and examples disclosed herein are for purposes of illustration and are not intended to be limiting, with the scope being indicated by the following claims.

What is claimed is:

1. An antenna system for a vehicle, wherein the vehicle comprises a non-metallic roof, comprising:
    a first metallic support coupled to the roof;
    a first antenna coupled to the first metallic support, wherein the first metallic support forms a ground plane for the first antenna and separates the first antenna from the non-metallic roof;
    a second metallic support coupled to the roof;
    a second antenna coupled to the second metallic support, wherein the second metallic support forms a ground plane for the second antenna and separates the second antenna from the non-metallic roof;
    a third antenna coupled to the first metallic support; and
    a fourth antenna coupled to the second metallic support, wherein the third antenna and the fourth antenna form a MIMO antenna pair.

2. The antenna system according to claim 1, wherein a polarization of the first antenna is orthogonal to a polarization of the second antenna.

3. The antenna system according to claim 1, wherein the first metallic support and the second metallic support are physically separated from each other.

4. The antenna system according to claim 1, wherein the first antenna and the second antenna form a MIMO antenna pair.

5. The antenna system according to claim 1, wherein a polarization of the third antenna is orthogonal to a polarization of the fourth antenna.

6. The antenna system according to claim 1, wherein a radiation pattern of the first antenna is orthogonal to a radiation pattern of the second antenna.

7. The antenna system according to claim 1, wherein the first antenna is configured as a dual band antenna.

8. A method, comprising:
    transmitting via a first antenna coupled to a first metallic ground plane a first electromagnetic communication signal;
    transmitting via a second antenna coupled to a second metallic ground plane a second electromagnetic communication signal, wherein the first and second metallic ground planes are disposed on a non-metallic roof of a vehicle;
    transmitting via a third antenna coupled to the first metallic ground plane a third communication signal; and
    transmitting via a fourth antenna coupled to the second metallic ground plane a fourth communication signal, wherein the third antenna and the fourth antenna form a MIMO antenna pair.

9. The method of claim 8, wherein:
    the first electromagnetic communication signal is transmitted having a first polarization; and
    the second electromagnetic communication signal is transmitting having a second polarization, wherein the second polarization is substantially orthogonal to the first polarization.

10. The method of claim 8, wherein the first metallic support and the second metallic support are physically separated from each other.

11. The method of claim 8, wherein the first antenna and the second antenna form a MIMO antenna pair.

12. The method of claim 8, wherein a polarization of the third antenna is orthogonal to a polarization of the fourth antenna.

13. The method of claim 8, wherein the first electromagnetic communication signal is transmitted having a first radiation pattern; and
    the second electromagnetic communication signal is transmitting having a second radiation pattern, wherein the second radiation pattern is substantially orthogonal to the first radiation pattern.

14. An antenna system for a vehicle, wherein the vehicle comprises a non-metallic roof, comprising:
    two metallic supports coupled to the roof;
    a first MIMO antenna pair, wherein:
        a first antenna of the first MIMO antenna pair is coupled to a first support of the two metallic supports; and
        a second antenna of the first MIMO antenna pair is coupled to a second support of the two metallic supports; and
    a second MIMO antenna pair, wherein:
        a first antenna of the second MIMO antenna pair is coupled to the first support of the two metallic supports; and
        a second antenna of the second MIMO antenna pair is coupled to the second support of the two metallic supports; and
    wherein the two metallic supports are physically separated from each other.

15. The antenna system according to claim 14, wherein for each MIMO antenna pair, a polarization of the first antenna is orthogonal to a polarization of the second antenna.

16. The antenna system according to claim 14, wherein for each MIMO antenna pair, a radiation pattern of the first antenna is orthogonal to a radiation pattern of the second antenna.

17. The antenna system according to claim 14, wherein the metallic support conforms to contours of a region of the non-metallic roof.

* * * * *